Jan. 10, 1928. 1,655,423

C. A. JUENGST

SIGNATURE GATHERER

Filed Aug. 4, 1925 6 Sheets-Sheet 1

Inventor
CHARLES A. JUENGST
By His Attorney
Philip C. Peck

Jan. 10, 1928.

C. A. JUENGST 1,655,423

SIGNATURE GATHERER

Filed Aug. 4, 1925

Inventor
CHARLES A. JUENGST
By His Attorney

Jan. 10, 1928.
C. A. JUENGST
1,655,423
SIGNATURE GATHERER
Filed Aug. 4, 1925
6 Sheets-Sheet 3
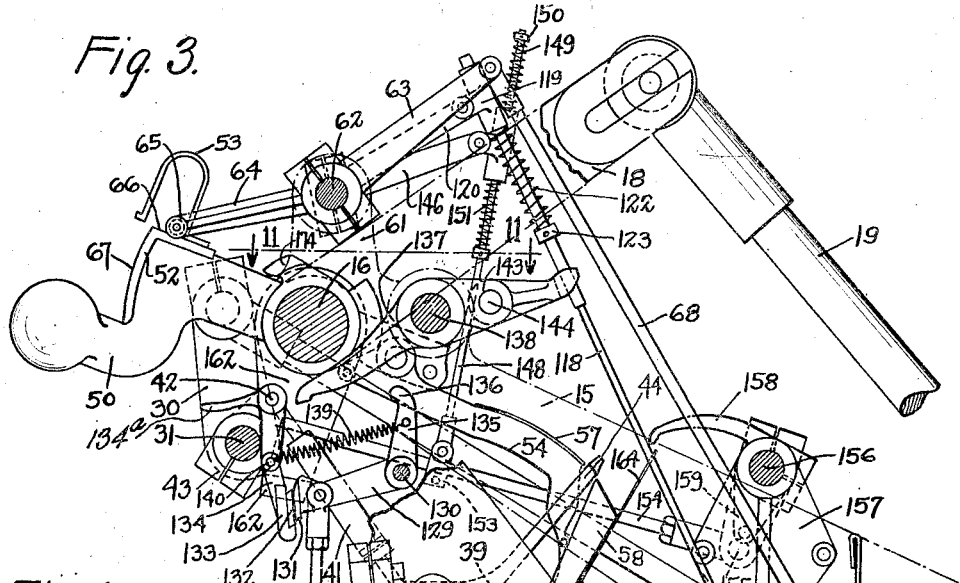
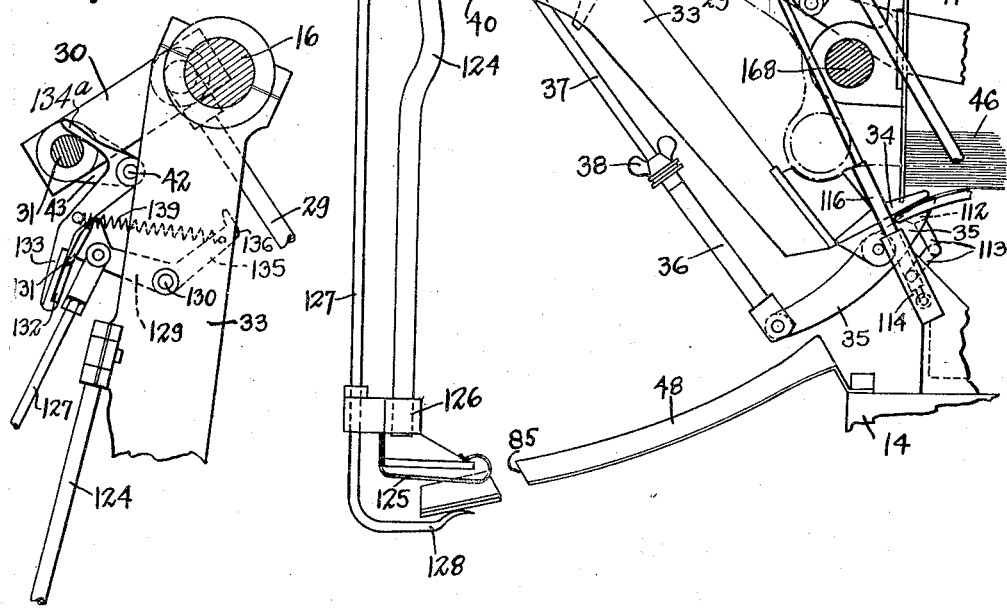
Inventor
CHARLES A. JUENGST
By His Attorney
Philip C. Keh Jan. 10, 1928.　　　　　　　　C. A. JUENGST　　　　　　　1,655,423
SIGNATURE GATHERER
Filed Aug. 4, 1925　　　　　　　6 Sheets-Sheet 4

Inventor
CHARLES A. JUENGST
By His Attorney

Jan. 10, 1928.
C. A. JUENGST
1,655,423
SIGNATURE GATHERER
Filed Aug. 4, 1925
6 Sheets-Sheet 5
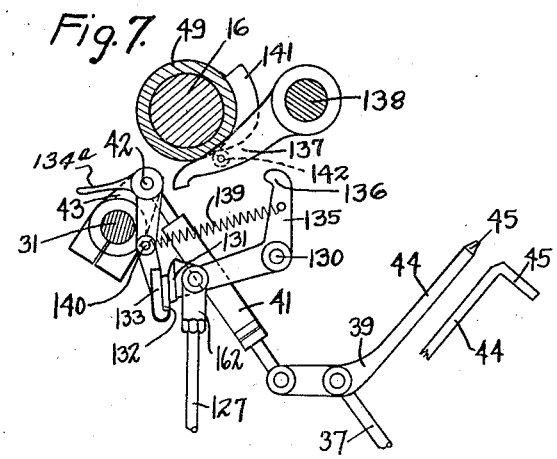
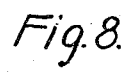
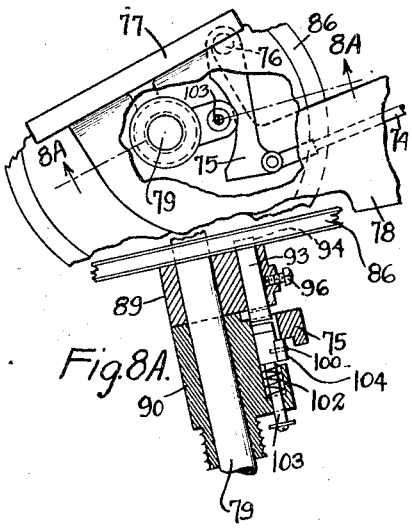
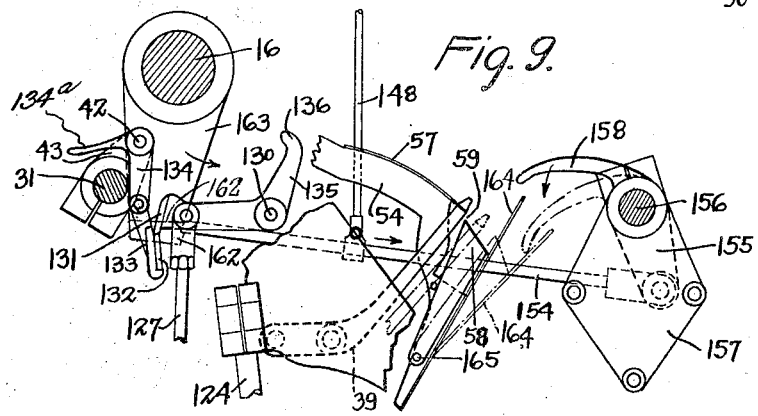
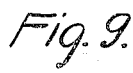
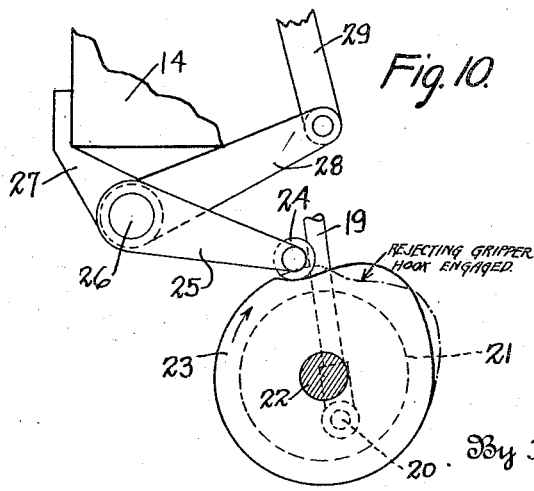
Inventor
CHARLES A. JUENGST
By His Attorney Inventor
CHARLES A. JUENGST
By His Attorney Patented Jan. 10, 1928.

1,655,423

UNITED STATES PATENT OFFICE.

CHARLES A. JUENGST, OF CROTON FALLS, NEW YORK, ASSIGNOR TO AMERICAN ASSEMBLING MACHINE COMPANY, OF NEW YORK, N. Y., A CORPORATION OF DELAWARE.

SIGNATURE GATHERER.

Application filed August 4, 1925. Serial No. 48,047.

My invention relates to the type of signature-gathering machines such as have heretofore been set forth in Letters Patent granted to me, for example, U. S. Letters Patent No. 828,665, issued August 14, 1906, and No. 1,071,555, of August 26, 1913.

The objects of my present invention are, among other things, to provide novel automatic devices to be used in conjunction with the normally swinging gripper-arms carrying gripper-fingers which engage the lowermost signatures or sheets of the superposed piles in the various units, and which remove the successive signatures one at a time and deliver same to the conveyor-trough. According to my invention whenever the gripper-fingers fail to take a signature or sheet, or whenever they take one of a thickness different from the predetermined thickness for which the gripper fingers are set, then my improved auxiliary gripper attached to the gripper arm is automatically actuated to seize such imperfect signature or sheet in the conveyor-trough and carry same onto a take-off board, while the main gripper-arm in the next cycle removes a perfect signature or sheet from the same pile and deposits same in its proper place in the conveyor-trough in lieu of no signature or the imperfect signature delivered in the preceding cycle. Furthermore I have also provided novel automatic means to interrupt the operation of the conveyor mechanism by uncoupling the driving clutch and also to shut off the pneumatic suction from the suckers which are usually employed in conjunction with the main gripper-arms and fingers to bend down the lowermost signature or sheet from the pile, and I have also provided means to prevent the gripper-arms and fingers from operating to remove signatures from their respective piles in the units other than the one from which no signature or an imperfect signature was withdrawn until a perfect signature has been seized and deposited in its proper place in the conveyor trough, all of which mechanisms are controlled and brought into operation whenever any one of the normally-operating gripper-arms and fingers in any of the adjacent units fails to remove a signature or removes an imperfect signature of improper thickness and deposits same in the conveyor trough. Means are also provided for automatically restoring the various parts to their normal operation whenever the improper delivery has been corrected in any of the operating units so that my improved signature-gathering machine will be wholly automatic in its action when abnormal conditions occur.

Further novel features and advantages will hereinafter be set forth and be particularly pointed out in the claims.

In the drawings showing a preferred embodiment of my invention, Fig. 1 is a side elevation of a unit of my improved signature-gatherer with the gripper fingers shown in engagement with a single or perfect signature or sheet with the various mechanisms shown in normal operating positions;

Fig. 3 is an enlarged side elevation with the gripper-arm broken away to show the trip-operating mechanism actuated when the gripper-fingers on the gripper-arm close on no signature or an imperfect signature of improper thickness;

Fig. 4 is a fragmentary side view of the auxiliary gripper operating mechanism which is "set" when the main gripper fingers close on an imperfect signature;

Fig. 7 is a section taken on the line 7—7 of Fig. 2 showing the auxiliary gripper trip-hook in disengaged position;

Fig. 8 is a partial side view of the clutch mechanism connected with the conveyor;

Figure 2:
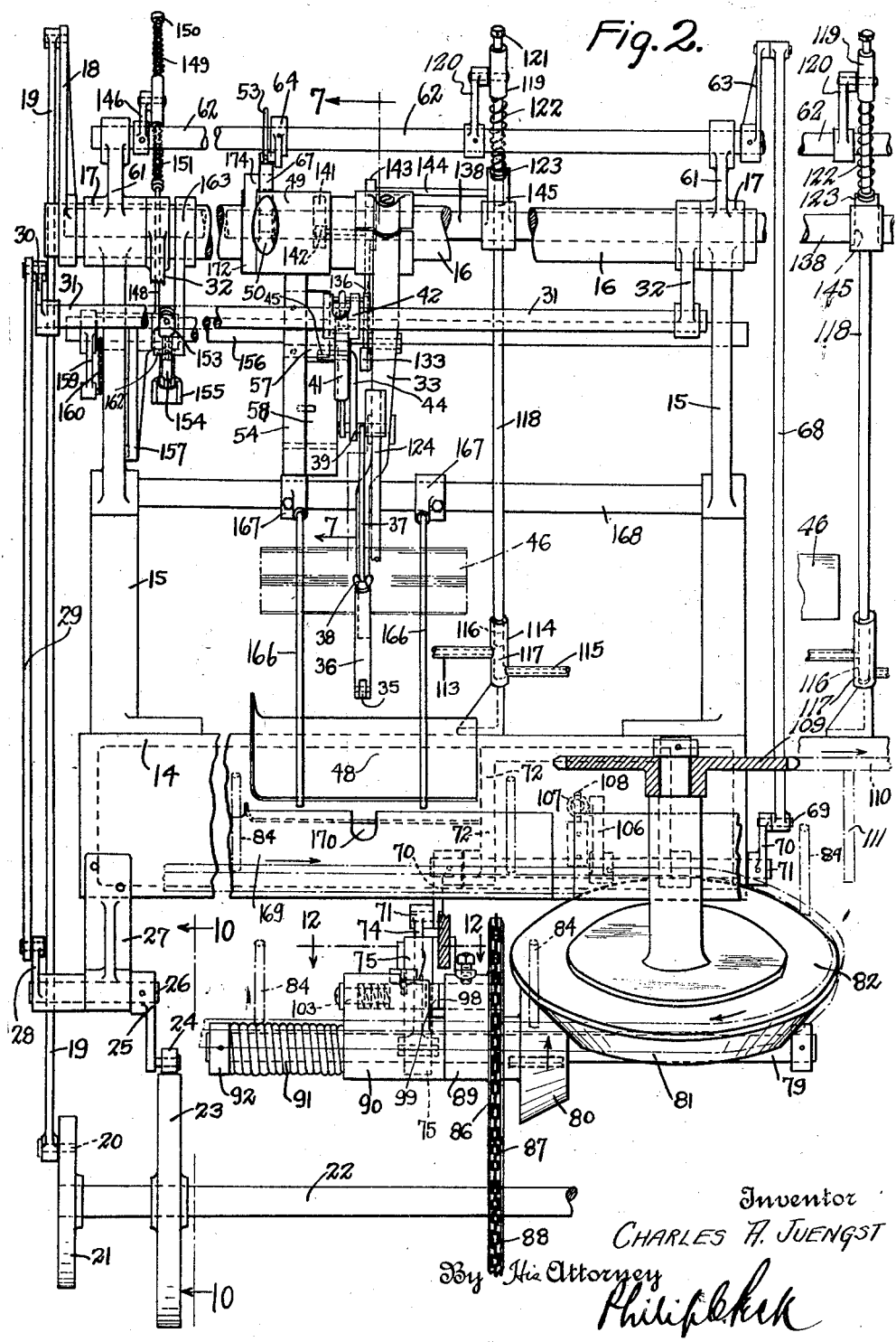
Fig. 2 is a front elevation of the apparatus shown in Fig. 1 together with the pneumatic suction valve mechanism of the adjacent unit, portions thereof being omitted for clearness, such omitted parts being illustrated in other figures.
Figure 11:
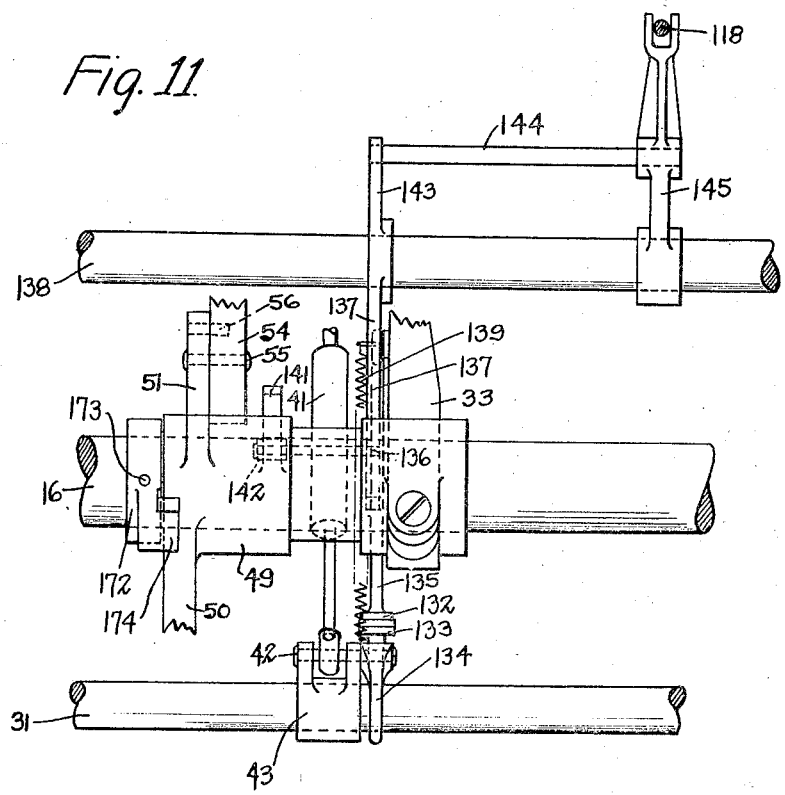
Figure 12:
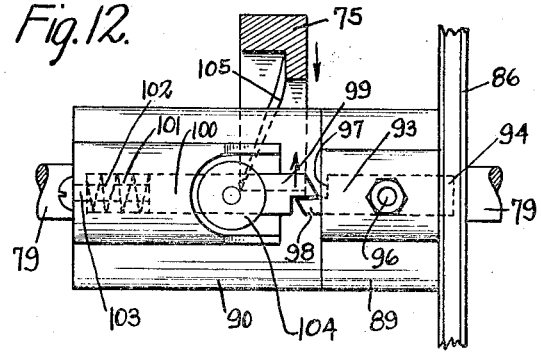

Fig. 8$^A$ is a section taken on the line 8$^A$—8$^A$ of Fig. 8 showing the inner structure of the clutch mechanism;

Fig. 9 is a detailed fragmentary view of the auxiliary gripper trip-hook in engaged position, the relative positions of the main gripper trip members on the adjacent units being shown in outline;

Fig. 10 is a side elevation of the cam and associated levers which operate the mechanisms for setting the signature-rejecting gripper taken on the line 10—10 of Fig. 2;

Fig. 11 is a top plan view taken on the line 11—11 of Fig. 3 looking downwardly;

Fig. 12 is an enlarged section on the line 12—12 of Fig. 2; and

Figure 13:
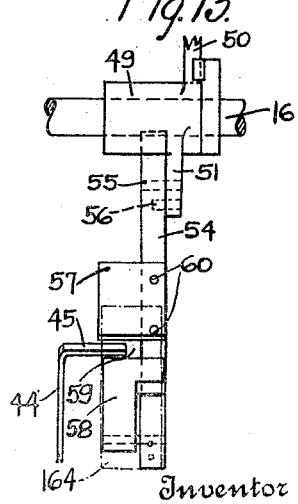

Fig. 13 is a detail view looking from the right in Fig. 3.

Similar numerals refer to similar parts throughout the several figures.

Figure 1:
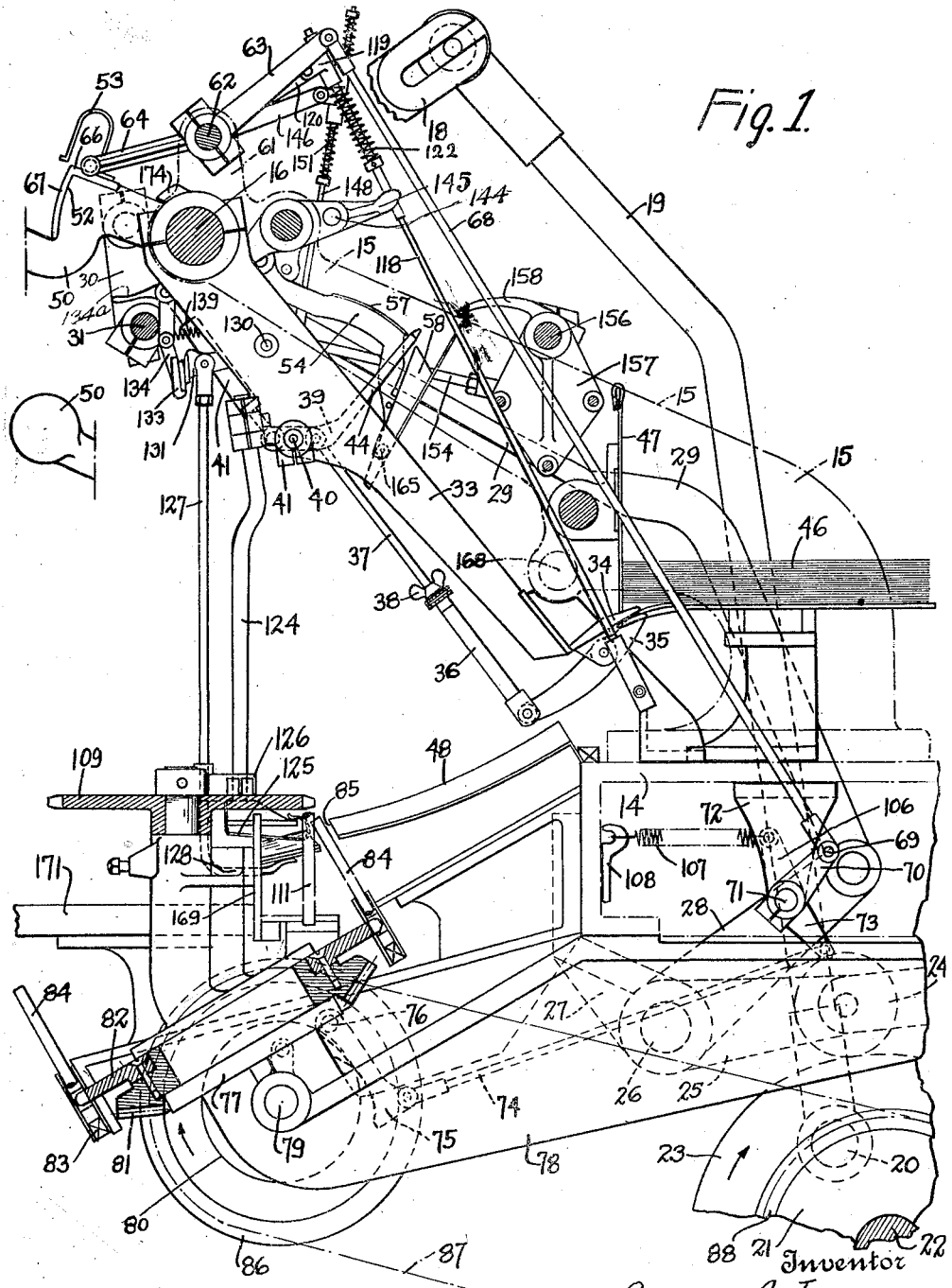

Referring to the drawings which show only a single unit of mechanisms embodied in the complete signature-gatherer, the base frame 14 supports the two bracket standards 15 (Fig. 2) which carry the rock-shaft 16 in bearings 17 fitted in the upper ends of the standards 15. A succession of such units of like construction are arranged in alinement to form the complete machine, the pile of signatures and pneumatic valve mechanism of the next unit being indicated in Fig. 2. The crank-arm 18 secured to the rock-shaft 16 is bifurcated at its free end where it receives the upper end of the connecting-rod 19, the lower end of the rod 19 being fastened to the pin 20 on the face of the wheel 21 affixed to the power-shaft 22 as shown in Figs. 1 and 2. The power-shaft 22 carries the cam 23 which engages the cam-roller 24 pivoted on the lower arm of the bell-crank lever 25 secured to the stub-shaft 26 journalled in the bracket 27 secured to the base frame 14 (Fig. 2). The upper arm 28 of the bell-crank lever 25 has pinned thereto the rod 29 pivoted to the free end of the rock-arm 30 secured to the end of the rock-shaft 31 journalled in the bracket 32 adjacent the right-hand bearing 17 as shown in Figs. 2 and 4.

Figure 5:
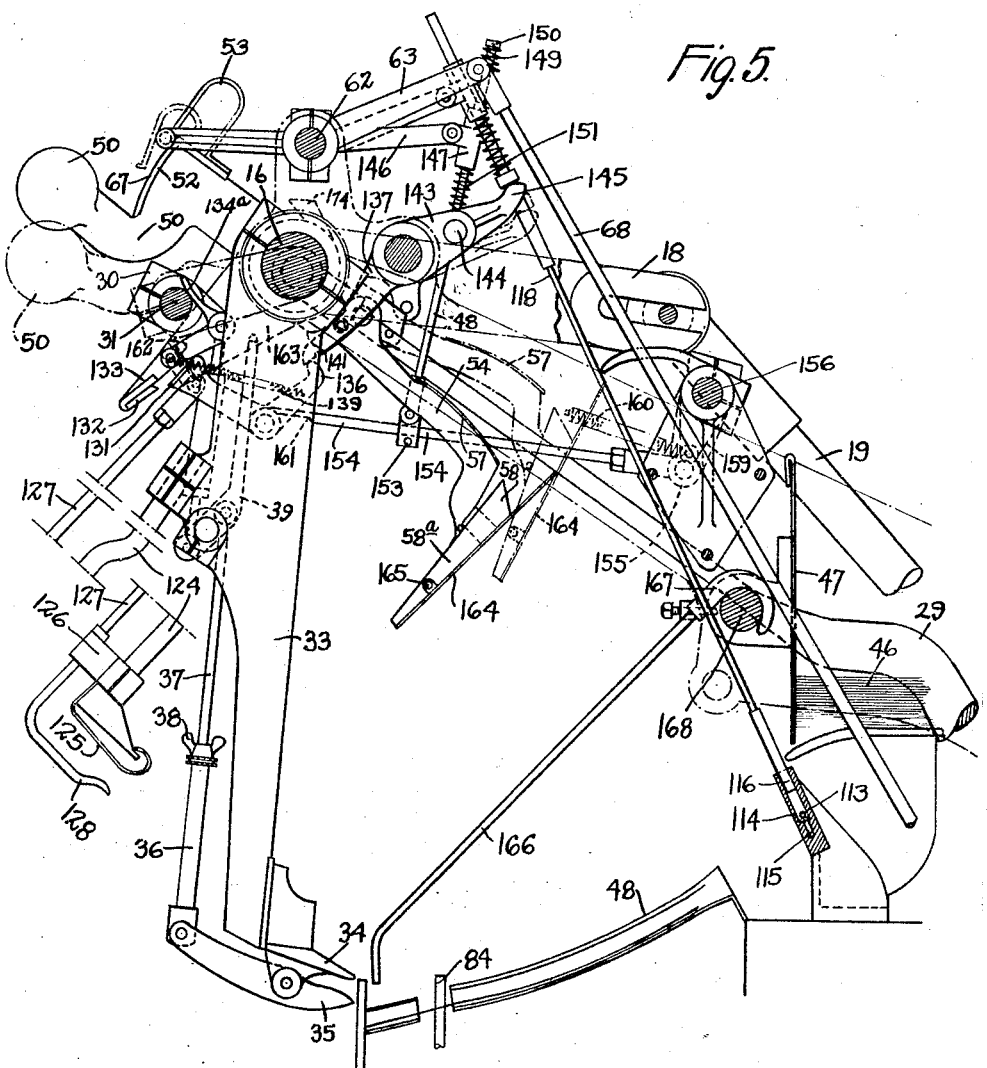
Fig. 5 is a side elevation of the mechanisms after the main gripper has delivered an imperfect signature in the conveyor trough with the auxiliary gripper broken away but set to remove the imperfect signature on the forward stroke of the main gripper.

The main gripper arm 33 of this machine unit is rigidly secured to the rock-shaft 16 and has the upper stationary gripper finger 34 at its free end and the lower gripper finger 35 pivoted on a projection from the finger 34 as shown in Fig. 5. A tubular rod 36 is pinned to the finger 35 at its lower outer end, while the upper end of the rod 36 is connected with the adjusting rod 37 by the wing-nut 38. A rocker-arm 39 is pivoted on the bracket 40 formed on the gripper-arm 33 and the adjusting rod 37 is pivotally connected at one end to the rocker-arm 39, while the rod 41 is pinned to the other end of the arm 39. The rod 41 extends upwardly and its upper end is pivotally connected to the pin 42 (Figs. 3 and 7) on the crank 43 secured to the rock-shaft 31 which is arranged parallel with the rock-shaft 16.

The rocker-arm 39 is provided with a forward extension in the form of the detector-arm 44 terminating in a finger 45 set at right angles thereto (Figs. 2, 3, 7 and 13). The rock-shafts 16 and 31 are rocked simultaneously by the wheel 21 and cam 23 respectively, and such movements cause the gripper-arm 33 to swing to the place where the signatures are taken and also actuate the gripper fingers 34 and 35 so as to remove a signature or sheet one at a time from the superposed pile 46 carried in hopper 47 and deposit same in the conveyor trough 48 fastened to the base-frame 14.

Loosely sleeved on the rock-shaft 16 is the hub 49 carrying the weighted shoulder end 50 and also the arm 51 extending in a direction opposite to the end 50 (Fig. 11). The shoulder end 50 has secured thereto the angle-rib 52 and the spring-arm 53 (Figs. 1, 3 and 5) of bent form so that the tip of the arm 53 comes closely adjacent to the point of the angle-rib 52 to hold the roller 65 in yielding engagement with curved face 67 (Fig. 5) as hereinafter described. The auxiliary lever 54 of slightly bent form is pivoted at 55 to the arm 51 which carries the side lug 56 adapted to bear on the under surface of the lever 54 to prevent the lever 54 falling out of relation with the arm 51 and weighted shoulder end 50 (Figs 11 and 13). The lever 54 has affixed thereto the curved plate end 57 projecting to one side of the lever 54 (Fig. 13), and also the curved plate 58 likewise projecting to the same side of the lever 54 and spaced apart from the plate end 57 so as to form the notch 59 in adjacent relation to the lever 54 between said plates (Fig. 13). The plate end 57 is provided with screw bolts 60 to adjust the plate end 57 relatively with the plate 58 which is mounted on bracket 58ª pinned to the lever 54 (Figs. 1 and 5) so as to increase or decrease the aperture of the notch 59 arranged between these parts. This device approximates the structure shown and described in my U. S. Letters Patent No. 828,665, and performs substantially the same function, viz: so long as the gripper-fingers 34 and 35 on the swinging main gripper-arm 33 engage a signature or sheet of predetermined thickness for which such gripper fingers were set, then there is no change of relation of the detector-arm 44 and finger 45 with the other parts of the machine, and with the inward movement of the gripper-arm 33 (to the right in Fig. 1) in this condition, the detector-arm 44 and finger 45 swing past the edges of the plates 57 and 58 and the finger 45 sweeps over the surface of the plate 58 and passes through the notch 59. However whenever the gripper-fingers 34 and 35 engage a signature or sheet of less or more than the predetermined thickness, or fail to take any signature or sheet, then the position of the various parts is changed and the location of the finger 45 is altered so that when such finger swings over the surface of the plate 58, it will not pass through the notch 59 but will contact forcibly with the surface of the plate 57 or the plate 58 and with the further outward movement or stroke of the main gripper-arm 33 (to the left in Fig. 1) will pull downwardly on the lever 54 and the arm 51 and swing upwardly the shoulder end 50 from its dotted line position to the full line position shown in Fig. 5.

The upper ends of the standards 15 are provided with the supports 61 in which is journalled the rock-shaft 62 having the rock-arm 63 affixed thereto at one end (Figs. 1 and 2). The rock-shaft 62 also has secured thereto the arm 64 carrying on its free end the roller 65 normally bearing on the straight face 66 of the angle-rib 52 as shown in Figs. 1 and 3. When the shoulder-end 50 is raised to the full line position of Fig. 5, the roller 65 passes over the point of the angle-rib 52 onto the curved face 67 thereof and is held in such position by the tip of the spring-arm 53.

Figure 6:
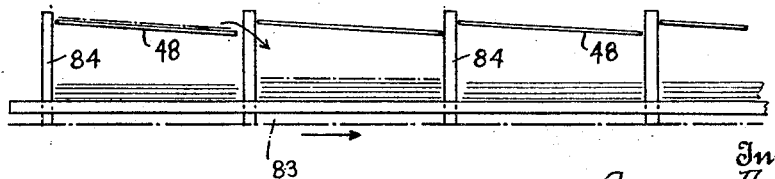
Fig. 6 is a diagrammatic lay-out of the signature-receiving boards showing how they are piled by the moving conveyor.

The rock-arm 63 has pivoted thereto the connecting rod 68 which extends downwardly and is pivoted to the pin 69 carried by the arm 70 fast to the cross-shaft 71 journalled in the brackets 72 secured to the base frame 14 as shown in Figs. 1 and 2. The lower arm 73 pinned to the shaft 71 is pivotally connected by the link 74 to the cam-arm 75 which rocks on the pin 76 secured in the plate 77 mounted on the bracket 78 which is fastened to the base frame 14 as shown in Fig. 1. The bracket 78 has journalled therein the cross-shaft 79 on which is keyed the bevel-gear 80 which engages the inclined bevel-gear 81 which carries the sprocket 82 and carrier-chain 83 having the spaced-apart vertical pins 84 adapted to pass through the slotted openings 85 formed in the conveyor trough 48 as shown in Figs. 1, 2 and 5 and also diagrammatically in Fig. 6, the pins 84 forming compartments for the assembled signatures.

Adjacent the hub of the gear 80 is the sprocket 86 driven by the chain 87 passing around the sprocket 88 fastened to the power-shaft 22 as shown in Figs. 1 and 2. Referring to Figs. 2, 8, 8ᴬ and 12, the sleeves 89 and 90 are journalled on the shaft 79 with the drive compression spring 91 coiled about the shaft 79 and secured to the collar 92 pinned to the shaft 79 and also seated on the hub of the sleeve 90 normally forcing the sleeve 90 against the face of the sleeve 89. The sleeve 89 carries the slidable pin 93 having one end 94 adapted to engage the hole 95 cut in the sprocket 86 so that the sprocket 86 and sleeve 89 may revolve in unison. The set-screw 96 in the sleeve 89 bears on the pin 93 to hold same in position. The opposite end of the pin 93 has the cut-out portion 97 to form the finger 98 adapted to engage with the bevel finger 99 formed in the outer end of the pin 100 which slides in the bore 101 cut in the sleeve 90 as shown in Figs. 8ᴬ and 12. The coil spring 102 coiled about the stem 103 of the pin 100 normally urges this pin outwardly from the bore 101 so that the fingers 98 and 99 are in engagement to cause the sprocket 86 to drive the gear 80 in the direction shown by the arrow in Figs. 1 and 2 through the coil spring 91 attached to the shaft 79 and sleeve 90. The pin 100 has pivoted thereto the cam-roller 104 which is adapted to be engaged by the cam surface 105 of the cam-arm 75 (Figs. 2 and 12) when the arm 75 is moved to the left in Fig. 1 by the link 74 and so retract the pin 100 from engagement with the pin 93. This movement of the cam-arm 75 immediately uncouples the clutch connection between the sprocket 86 and the gear 80 to interrupt the operation of the conveyor mechanism or carrier 83 passing through the trough 48 with a yielding flexible connection between the parts due to the drive through the coil-spring 91. The shaft 71 has the arm 106 secured thereto with the spring 107 attached to its free end and also to the hook 108 fastened to the base frame 14; such spring 107 normally holds the cam-arm 75 retracted so that the cam-surface 105 will not engage the cam-roller 104 (Figs. 1, 2 and 8ᴬ).

Referring to Figs. 1 and 2 the sprocket 109 carries the delivery chain 110 having the depending fingers 111 moving in the direction of the arrow in Fig. 2 to advance the signatures to the next unit in conjunction with the conveyor chain 83. In Fig. 3 the sucker device 112 coacts with the gripper fingers 34 and 35 to turn the lowermost signature or sheet from the pile 46, which sucker 112 is connected by the pipe 113 with the suction valve sleeve 114, the pipe 115 being connected with any suitable source of suction (not shown). The suction valve 116 slides in the bore 117 of the sleeve 114 and is attached to the connecting rod 118. The upper end of the rod 118 passes through the sleeve 119 pivotally connected with rock-arm 120 pinned to the rock-shaft 62 (Fig. 2), and the end of rod 118 carries the head 121 while the coil spring 122 attached to the sleeve 119 and collar 123 secured on the rod 118 normally holds the valve 116 raised so that a free pneumatic suction connection is maintained between the pipes 113 and 115 through the sleeve 114 as shown in Fig. 2.

The novel mechanism for removing an imperfect signature from the conveyor trough 48 when the main gripper arm 33 has deposited same in the trough is best shown in Figs. 1–5, and comprises the auxiliary gripper fingers and their operating mechanism which is actuated in conjunction with the main gripper-arm 33 which takes the signatures from the pile 46. Fastened to a bracket on the gripper-arm 33 (Fig. 4) is the depending bar 124 which terminates in the upper spring gripper finger 125. The bar 124 carries the bracket 126 through which is slidable the lower gripper arm 127 which terminates in lower gripper finger 128 to close on the finger 125 as shown in Figs. 3 and 5. The upper end of the gripper-arm 127 is pivotally connected to the rock-lever 129 (Figs. 4, 7 and 9) pivoted on the pin 130 fastened to the main gripper-arm 33 (Fig. 4). The rear end of the rock-lever 129 carries the bevel-edged plate 131 which is adapted to engage and slide in surface-to-surface contact (Figs. 1 and 3), with the complementary bevel-edged plate 132 mounted on the depending arm 133 of the bell-crank lever 134 journalled on the pin 42 on the crank-arm 43 during the normal operation of the gripper-arms 33 and 127 (Figs. 7 and 9). The upper arm 134ª of this bell-crank lever 134 extends outwardly over the rock-shaft 31 (Figs. 1 and 3), so that when the rock-arm 30 is swung to the left by the rod 29, the shaft 31 will bear against the arm 134ª to rock the bell-crank lever 134 in a clockwise direction as shown in Fig. 5 ready to bring the two bevel-edged plates 131 and 132 into their alined position (Fig. 4) as will be hereinafter described. The trip-hook 135 of the lever 129 extends upwardly with a curved tip 136 adapted to engage the end of the trip-arm 137 mounted on the trip-shaft 138 journalled on the standards 15 as shown in Fig. 3. The spring 139 attached to the pin 140 on the arm 133 and the finger 135 normally depresses the gripper-arm 127 as shown in Figs. 3 and 7. Referring more particularly to Figs. 3, 5 and 7, the hub 49 is provided with the cam 141 which is adapted to engage the roller 142 pinned to the trip-arm 137 and to depress the arm 137 until it engages the curved tip 136 of the trip-hook 135 (Fig. 5) when the hub 49 is rocked in a clockwise direction. The trip-arm 137 is prolonged to form the arm 143 (Fig. 11) carrying the cross rod 144 which engages the rock-arm 145 journalled on the trip-shaft 138. The end of the arm 145 is bifurcated to enclose the rod 118 and, when raised to the full line position (Fig. 5), presses against the collar 123 to prevent the rod 118 from lowering the valve 116 thereby maintaining the suction connection in the sucker 112 in the particular unit where the main grippers 34, 35 have delivered an imperfect signature and thereby compressing the spring 122 against the sleeve 119. In the remaining units of the signature-gatherer the suction in the suckers 112 is broken when the rods 118 and valves 116 are lowered by the arms 120 whereby the pipes 113 are cut off from the pipes 115 in such units, one of the lowered arms 145 in the adjacent unit being shown in Fig. 2 together with the lowered valve 116 to break the suction.

Referring to Figs. 1–3, 5 and 9, the rock-shaft 62, carries the arm 146 pivotally connected with the sleeve 147 in which the rod 148 is slidably mounted. Coiled about the rod 148 is the compression spring 149 bearing on the top of the sleeve 147 and the cap-collar 150 secured to the end of the rod 148; the compression spring 151 is also coiled about the rod 148 between the lower end of the sleeve 147 and the collar 152 pinned to the rod 148 as shown in Fig. 3. The lower end of the rod 148 is pivoted to the bracket 153 fastened to the slide-bar 154 pivotally connected with the arm 155 affixed to the transverse rock-shaft 156 journalled in the bracket 157 secured to the left-hand standard 15 (Fig. 2). The rock-shaft 156 also has mounted thereon the downwardly-curved finger 158 as shown in Figs. 1, 3 and 9. The rock-arm 159 is also affixed to the rock-shaft 156 with the tension spring 160 fastened to the arm 159 and the standard 15 normally to hold the slide-bar 154 to the left (Fig. 5) and also to maintain the finger 158 in its raised and full line position (Fig. 9). The free end of the slide-bar 154 has a cut-out shoulder 161 (Fig. 5) adapted to be engaged by the lug 162 preferably formed integrally (Fig. 2) on the free end of the rock-arm 163 fastened to the rock-shaft 16 (Fig. 9) after the slide-bar 154 is depressed by the rod 148 (Fig. 5). Then the bar 154 is shifted to the right to lower the finger 158 until it engages and depresses the flat plate 164 pivoted at 165 to the bracket 58ª to enlarge the notch 59 as shown by dotted lines in Fig. 9 to permit the depressed detector arm 44 (dotted lines in Fig. 9) to have a free movement through this notch; otherwise the detector 44 would engage the surface of the plate 58 and so lower the lever 54. This enlargement of the notch 59 permits an idle movement of the main gripper-arm 33 when the finger 158 is lowered.

Referring to Figs. 2 and 5, a pair of strippers 166 are mounted on brackets 167 adjustably bolted to the tie-rod 168 secured to the standards 15 with the lower ends of the strippers 166 above the conveyor-trough 48 adjacent the back-plate 169 having the cut-out notch 170 (Fig. 2) to permit the passage of the gripper-fingers therethrough (Fig. 1). Mounted on the bracket 78 adjacent the back-plate 169 is the horizontal take-off board 171 upon which the imperfect signatures are deposited by the auxiliary gripper-fingers 125 and 128.

Means are provided to place the various devices I have described in position for resetting the parts to normal operation through the continued movement of the machine. In the present embodiment (Figs. 1–3, 5 and 11), the bracket 172 secured to the rock-shaft 16 by the pin 173 (Fig. 11) carries the side-lug 174 adapted to engage the upper surface of the shoulder end 50 when the shaft 16 is rocked in an anti-clockwise direction in order to lower the shoulder-end 50 from the full line to the dotted line position in Fig. 5, thereby allowing the main gripper-arm 33 to resume its normal swinging movement to the right to remove a signature from the pile 46 and the other devices to be restored to the positions shown in Figs. 1 and 3.

The operation of my improved signature-gatherer is clearly illustrated in the various figures. In Figs. 1 and 3 the main gripper-fingers 34 and 35 on the inwardly-swung arm 33 have seized the lowermost signature from the pile 46 and are about to deliver same in the conveyor-trough 48; the auxiliary gripper-fingers 125 and 128 are open and lie in the notch 170, and the other actuating devices are in normal operative condition. Should the gripper-fingers 34 and 35 miss a signature or take a signature of improper thickness, the detector-arm 44 and finger 45 will not pass through the notch 59 but will contact with the plates 57 or 58 and depress the auxiliary lever 54 on the outward movement or stroke of the gripper-arm 33, and will also raise the shoulder end 50. Simultaneously the cam 141 rotates to the position shown in Fig. 5 which lowers the trip-arm 137 to engage the trip hook 135 on the lever 129 to lift the bevel-edged plate 131 away from its surface-to-surface contact with the plate 132 which has been swung outwardly by the shaft 31 bearing on the arm 134ª integral with the depending arm 133 carrying the plate 132 all as shown in Fig. 5, ready to swing into their superposed position shown in Fig. 4 with the gripper-arm 127 raised; at the same time the lifting movement of the shoulder end 50 causes the roller 65 to run over the point of the angle-rib 52 to rock the shaft 62 in a clockwise direction which simultaneously depresses the rod 68 to cause the uncoupling of the flexible drive clutch connection with the gears 80 and 81 which operate the carrier chains 83, and also lowers the rods 118 to cut off the suction from the suckers 112 in the other units in which a perfect signature has been delivered in the trough 48, as has been hereinbefore described. Fig. 5 shows the parts at the end of the outward stroke with the main gripper fingers 34 and 35 having delivered an imperfect signature in the trough 48, and the auxiliary gripper-fingers 125 and 128 retracted and open. At the commencement of the succeeding inward stroke of the gripper-arm 33 the parts are brought to the position shown in Fig. 4 with the plate 132 engaged beneath the plate 131; then as the arm 33 swings inwardly and toward the hopper 47 the normally open auxiliary grippers 125 and 128 will close gradually on their inward stroke and seize on the imperfect signature in the trough 48 and then deliver same on the take-off board 171 on the outward stroke of the arm 33 (to the left in Fig. 1). When rock-shaft 62 oscillates in a clock-wise direction from the Fig. 3 to the Fig. 5 position, as just described, the rod 148 is also lowered which brings the shoulder 161 of the slide bar 154 into the orbit of the lug 162 of the rock-arm 163. Then as this arm 163 moves to the right in the direction of the arrow (Fig. 9) on the anti-clock-wise movement of the shaft 16 just described, the bar 154 is moved to rock the shaft 156 to lower the finger 158 to its dotted line position thereby depressing the plate 164 to enlarge the notch 59 so that the detector arm 44 (as shown by dotted lines in Fig. 9) will not engage the plates 58 or 59 and will operate idly with the main gripper devices in all the units untripped while the auxiliary gripper mechanism (on the idle outward stroke of the arm 33) is removing the imperfect signature from the particular unit in which the main grippers 34 and 35 had missed a signature or taken an imperfect signature in the preceding cycle. Fig. 10 shows how the cam 23 operates in resetting the auxiliary gripper devices with the high part of the cam operating through the rod 29 to open the gripper fingers 125 and 128 at the end of their stroke.

In restoring the various parts to normal conditions from their Fig. 5 position, the operator moves the shoulder end 50 to its dotted line position thereby releasing the roller 65 from the angle-rib 52 and the shaft 62 rocks in an anti-clockwise direction from the force of the springs 122 and 151 whereby the arm 145 and rod 148 are lifted which restores the suction in the sucker 112 and raises the finger 158 from the plate 164, the latter assuming its full line position shown in Fig. 3. At the same time the trip-arm 137 is lifted as it follows the cam 141 when the over-weighted rock-arm 145 falls by gravity to its Fig. 3 position, and the auxiliary lever 54 with associated devices is raised to their normal position shown in Figs. 1 and 3. The bevel-edged plates 131 and 132 have a surface-to-surface contact and slide over each other as the gripper-arm 33 is swung inwardly and outwardly under normal conditions, and the outward movement of the cam-arm 75 is accomplished by the lifting of the rod 68 when the rock-shaft 62 rocks in an anti-clockwise direction thereby allowing the clutch fingers 98 and 99 automatically to reengage by the spring 102 as shown in Fig. 12 to start the movement of the carrier chains 83.

My invention, in its broader aspects, is not limited to the particular construction and arrangement of the actuating parts shown and described, as many changes may be made in the structural details without departing from the main principles of the invention and without sacrificing its chief advantages.

I claim as my invention:

1. In a signature-gatherer, a movable gripper normally delivering a signature of predetermined thickness to a carrier and means associated with said gripper for removing a delivered signature of different thickness from said carrier.

2. In a signature-gatherer, a movable gripper normally delivering a signature of predetermined thickness to a carrier, and normally inoperative means associated with said gripper for removing a delivered signature of different thickness from said carrier.

3. In a signature-gatherer, a movable gripper normally delivering a signature of predetermined thickness to a carrier, and means actuated by said movable gripper for removing a signature of different thickness delivered by said gripper from said carrier.

4. In a signature-gatherer, a movable gripper normally delivering a signature of predetermined thickness to a carrier, and normally inoperative means actuated by said movable gripper for removing a signature of different thickness from said carrier.

5. In a signature-gatherer, a movable gripper normally delivering a signature of predetermined thickness to a carrier, mechanism connected with the gripper to detect variations in thickness of signatures taken by the gripper from a predetermined thickness, and means for removing a signature of different thickness from the carrier after delivery by said gripper.

6. In a signature-gatherer, a movable gripper normally delivering a signature of predetermined thickness to a carrier, mechanism connected with the gripper to detect variations in thickness of signatures taken by the gripper from a predetermined thickness, and automatically operated means for removing a signature of different thickness from the carrier after delivery by said gripper.

7. In a signature-gatherer, a movable gripper normally delivering a signature of predetermined thickness to a carrier, mechanism connected with the gripper to detect variations in thickness of signatures taken by the gripper from a predetermined thickness, and normally inoperative means controlled by said detector mechanism for removing a signature of different thickness from the carrier after delivery by said gripper.

8. In a signature-gatherer, a main movable gripper normally taking a signature of predetermined thickness and an auxiliary gripper associated with said main gripper for taking and removing a signature of different thickness after the latter has been delivered by the main gripper.

9. In a signature-gatherer, a main movable gripper normally taking a signature of predetermined thickness and an auxiliary gripper associated and coacting with said main gripper for taking and removing a signature of different thickness after the latter has been delivered by the main gripper.

10. In a signature-gatherer, a main movable gripper normally taking a signature of predetermined thickness and an auxiliary gripper associated and coacting with said main gripper for taking and removing a signature of different thickness in the next cycle after the latter has been delivered by the main gripper.

11. In a signature-gatherer, a main movable gripper normally taking a signature of predetermined thickness and an auxiliary gripper associated with said main gripper for taking and removing a signature of different thickness after the latter has been delivered by the main gripper and while said main gripper is taking another signature.

12. In a signature-gatherer, a main movable gripper normally taking a signature of predetermined thickness and an auxiliary gripper associated and coacting with said main gripper for taking and removing a signature of different thickness in the next cycle after the latter has been delivered by the main gripper and while said main gripper is taking another signature.

13. In a signature-gatherer, the combination of signature hoppers and a carrier, of means normally taking the signatures from the hoppers and delivering same on the carrier and separate means to remove an imperfect signature from the carrier when delivered thereto by said taking means.

14. In a signature-gatherer, the combination of signature hoppers and a carrier, of means normally taking the signatures from the hoppers and delivering same on the carrier and separate means mounted on said taking means to remove an imperfect signature from the carrier when delivered thereto by said taking means.

15. In a signature-gatherer, the combination of signature hoppers and a carrier, of means normally taking the signatures from the hoppers and delivering same on the carrier, mechanism connected with said taking means to detect variations in the thickness of signatures so taken from a predetermined thickness, and separate means to remove an imperfect signature from the carrier when delivered thereto by said taking means.

16. In a signature-gatherer, the combination of signature hoppers and a carrier, of means normally taking the signatures from the hoppers and delivering same on the carrier, mechanism connected with said taking means to detect variations in the thickness of signatures so taken from a predetermined thickness, and separate means controlled by said detector mechanism to remove an imperfect signature from the carrier when delivered thereto by said taking means.

17. In a signature-gatherer, the combination of signature hoppers and a carrier, of means normally taking the signatures from the hoppers and delivering same on the carrier, mechanism connected with said taking means to detect variations in the thickness of signatures so taken from a predetermined thickness, and separate means controlled by said detector mechanism and operable with said taking means to remove an imperfect signature from the carrier when delivered thereto by said taking means.

18. In a signature-gatherer, the combination of signature hoppers and a carrier, of means normally taking the signatures from the hoppers and delivering same on the carrier and automatically operated means to remove an imperfect signature from the carrier when delivered thereto by said taking means.

19. In a signature-gatherer, the combination of signature hoppers and a carrier, of means normally taking the signatures from the hoppers and delivering same on the carrier and automatically operated means moving in unison with said taking means to remove an imperfect signature from the carrier when delivered thereto by said taking means.

20. In a signature-gatherer, the combination of signature hoppers and a carrier, of normally swinging grippers to take the signatures from the hoppers and deliver same on the carrier and auxiliary grippers attached to said normally swinging grippers to remove an imperfect signature delivered by any of said normally swinging grippers operable through the continued movement of the machine.

21. In a signature-gatherer, the combination of signature hoppers and a carrier, of normally swinging grippers to take the signatures from the hoppers and deliver same on the carrier and auxiliary grippers attached to said normally swinging grippers to remove an imperfect signature delivered by any of said normally swinging grippers while said normally swinging gripper is taking and delivering another signature to the carrier, all operable through the continued movement of the machine.

22. In a signature-gatherer, the combination of signature hoppers and a carrier, of normally swinging grippers to take the signatures from the hoppers and deliver same on the carrier, detector mechanism connected with each gripper actuated by variations in thickness of the signatures from predetermined thickness, and auxiliary grippers attached to said normally swinging grippers and controlled by said detector mechanism to remove an imperfect signature delivered by any of said normally swinging grippers operable through the continued movement of the machine.

23. In a signature-gatherer, a carrier, means for normally taking signatures of predetermined thickness and delivering same on the carrier, coacting means for removing an imperfect signature delivered by said first means from the carrier, and means for interrupting the operation of the carrier when an imperfect signature is being removed therefrom.

24. In a signature-gatherer, a carrier, means for normally taking signatures of predetermined thickness and delivering same on the carrier, automatically-operated means for removing an imperfect signature from the carrier, and means for automatically interrupting the operation of the carrier when an imperfect signature is being removed therefrom.

25. In a signature-gatherer, a carrier, means for normally taking signatures of predetermined thickness and delivering same on the carrier, separate means for removing an imperfect signature from the carrier, means for interrupting the operation of the carrier when an imperfect signature is being removed therefrom, and means controlled by the operator to automatically cause said last means to resume normal operation through the continued movement of the machine.

26. In a signature-gatherer, a carrier, means for normally taking signatures of predetermined thickness and delivering same on the carrier, automatically-operated means for removing an imperfect signature from the carrier, means for automatically interrupting the operation of the carrier when an imperfect signature is being removed therefrom, and means controlled by the operator to automatically cause said last means to resume normal operation through the continued movement of the machine.

27. In a signature-gatherer, signature hoppers, pneumatic suckers to bend down the lowermost signature in the hoppers, means normally taking signatures of predetermined thickness from the hoppers, and means for shutting suction from all the suckers except where a signature of improper thickness has been taken by one of said first-mentioned means.

28. In a signature-gatherer, signature hoppers, pneumatic suckers to bend down the lowermost signature in the hoppers, means normally taking signatures of predetermined thickness from the hoppers, and automatically-operated means for shutting suction from all the suckers except where a signature of improper thickness has been taken by one of said first-mentioned means.

29. In a signature-gatherer, signature hoppers, pneumatic suckers to bend down the lowermost signature in the hoppers, means normally taking signatures of predetermined thickness from the hoppers, and means controlled and actuated by said taking means when seizing a signature of improper thickness for shutting suction from all the suckers except where a signature of improper thickness has been taken by one of said first-mentioned means.

30. In a signature-gatherer, signature hoppers, pneumatic suckers to bend down the lowermost signature in the hoppers, means normally taking signatures of predetermined thickness from the hoppers, and automatically-operated means controlled and actuated by said taking means when seizing a signature of improper thickness for shutting suction from all the suckers except where a signature of improper thickness has been taken by one of said first-mentioned means.

31. In a signature-gatherer, a main gripper, means for swinging the gripper, an auxiliary gripper, and means for opening and closing the auxiliary gripper actuated by the movement of the main gripper.

32. In a signature-gatherer, a main gripper, means for swinging the gripper, an auxiliary gripper coacting with said main gripper mounted on the main gripper and movable therewith, and means for opening and closing the auxiliary gripper actuated by the movement of the main gripper.

33. In a signature-gatherer, a main gripper, means for swinging the gripper, an auxiliary gripper, a trip mechanism connected with the main gripper, and normally inoperative means for opening and closing the auxiliary gripper brought into operative position when the trip mechanism is actuated by the main gripper.

34. In a signature-gatherer, a main gripper, means for swinging the gripper, an auxiliary gripper, a trip mechanism connected with the main gripper, and normally inoperative means for opening and closing the auxiliary gripper brought into operative position and actuated by said swinging means when the trip mechanism is actuated by the main gripper.

35. In a signature-gatherer, a main gripper, means for swinging the gripper, an auxiliary gripper mounted on the main gripper and movable therewith, a trip mechanism connected with the main gripper, and normally inoperative means for opening and closing the auxiliary gripper brought into operative position and actuated by said swinging means when the trip mechanism is actuated by the main gripper.

36. In a signature-gatherer, signature hoppers, a carrier, grippers having a swinging movement between the hoppers and carrier normally to deliver signatures to the latter, and means for preventing said grippers from delivering signatures whenever any of said grippers has missed or taken an imperfect signature.

37. In a signature-gatherer, signature hoppers, a carrier, grippers having a swinging movement between the hoppers and carrier normally to deliver signatures to the latter, and means for preventing such of said grippers as have taken perfect signatures from delivering signatures whenever any of said grippers has missed or taken an imperfect signature and until said gripper has taken a perfect signature.

38. In a signature-gatherer, signature hoppers, a carrier, grippers having a swinging movement between the hoppers and carrier normally to deliver signatures to the latter, detector mechanism for each gripper actuated when an imperfect or no signature is taken by the gripper, and means for preventing such of said grippers as have taken perfect signatures from delivering signatures whenever any of said grippers has missed or taken an imperfect signature.

39. In a signature-gatherer, signature hoppers, a carrier, grippers having a swinging movement between the hoppers and carrier normally to deliver signatures to the latter, detector mechanisms for each gripper actuated when an imperfect or no signature is taken by the gripper, and means controlled by any detector mechanism for preventing such of said grippers as have taken perfect signatures from delivering signatures whenever any of said grippers has missed or taken an imperfect signature.

40. In a signature-gatherer, signature hoppers, a carrier, grippers having a swinging movement between the hoppers and carrier normally to deliver signatures to the latter, detector mechanisms for each gripper actuated when an imperfect or no signature is taken by the gripper, and means controlled by any detector mechanism for preventing such of said grippers as have taken perfect signatures from delivering signatures whenever any of said grippers has missed or taken an imperfect signature and until said gripper has taken a perfect signature.

41. In a signature-gatherer, signature hoppers, a carrier, grippers having a swinging movement between the hoppers and carrier normally to deliver signatures to the latter, means for preventing such of said grippers as have taken perfect signatures from delivering signatures whenever any of said grippers has missed or taken an imperfect signature, and means operating automatically to restore the parts to normal operation.

42. In a signature-gatherer, signature hoppers, a carrier, grippers having a swinging movement between the hoppers and carrier normally to deliver signatures to the latter, detector mechanisms for each gripper actuated when an imperfect or no signature is taken by the gripper, means for preventing such of said grippers as have taken perfect signatures from delivering signatures whenever any of said grippers has missed or taken an imperfect signature, and means operating automatically to restore the parts to normal operation.

43. In a signature-gatherer, signature hoppers, a carrier normally swinging grippers moving between the hoppers and carrier to deliver signatures to the latter, means for preventing such of said grippers as have taken perfect signatures from delivering signatures whenever any of said grippers has missed or delivered an imperfect signature, and means for releasing said preventing means when said gripper has taken a perfect signature.

44. In a signature-gatherer, signature hoppers, a carrier, normally swinging grippers moving between the hoppers and carrier to deliver signatures to the latter, means for preventing such of said grippers as have taken perfect signatures from delivering signatures whenever any of said grippers has missed or delivered an imperfect signature, and automatically operated means for releasing said preventing means when said gripper has taken a perfect signature.

45. In a signature-gatherer, a normally swinging main gripper for taking the successive signatures, an auxiliary gripper to remove imperfect signatures only when such have been taken by the main gripper, and means for thereafter resetting said auxiliary gripper.

46. In a signature-gatherer, a normally swinging main gripper for taking the successive signatures, a normally inoperative auxiliary gripper travelling with the main gripper to remove imperfect signatures only when such have been taken by the main gripper, and means for thereafter resetting said auxiliary gripper in inoperative position.

47. In a signature-gatherer, a plurality of signature hoppers, a main gripper associated with each hopper to take signatures therefrom, a normally inoperative detector mechanism for each of the main grippers operable when any of the main grippers takes a signature of improper thickness, an auxiliary gripper for each main gripper controlled by said detector mechanism to remove an improper signature when such have been taken by its main gripper, and means for automatically restoring said detector mechanism to its operative position when its auxiliary gripper has acted.

48. In a signature-gatherer, signature hoppers, a carrier, main grippers having a swinging movement between the hoppers and carrier normally to deliver signatures to the latter, an auxiliary gripper carried by each main gripper for removing an imperfect signature when such have been taken by the main gripper, means for interrupting the operation of the carrier while any of the auxiliary grippers is removing an imperfect signature, and means for automatically restoring all the parts to normal operation.

49. In a signature-gatherer, signature hoppers, a carrier, main grippers having a swinging movement between the hoppers and carrier normally to deliver signatures to the latter, a detector mechanism for each main gripper actuated when an imperfect or no signature is taken by the main gripper, an auxiliary gripper carried by each main gripper and controlled by said detector mechanism for removing an imperfect signature when such have been taken by the main gripper, means for interrupting the operation of the carrier while any of the auxiliary grippers is removing an imperfect signature, and means for automatically restoring all the parts to normal operation.

50. In a signature-gatherer, signature hoppers, a carrier, main grippers having a swinging movement between the hoppers and carrier normally to deliver signatures to the latter, a detector mechanism for each main gripper actuated when an imperfect or no signature is taken by the main gripper, an auxiliary gripper carried by each main gripper and controlled by said detector mechanism for removing an imperfect signature when taken by the main gripper, means for interrupting the operation of the carrier while any of the auxiliary grippers is removing an imperfect signature, means for preventing the other main grippers from delivering signatures while said auxiliary gripper is in operation, and means for automatically restoring all the parts to normal operation.

CHARLES A. JUENGST.